Feb. 10, 1970  D. L. DE RESPIRIS  3,494,842
ATMOSPHERIC CONTROL UTILIZING AN ELECTROLYTIC
CARBON DIOXIDE CONCENTRATOR
Filed Aug. 26, 1965
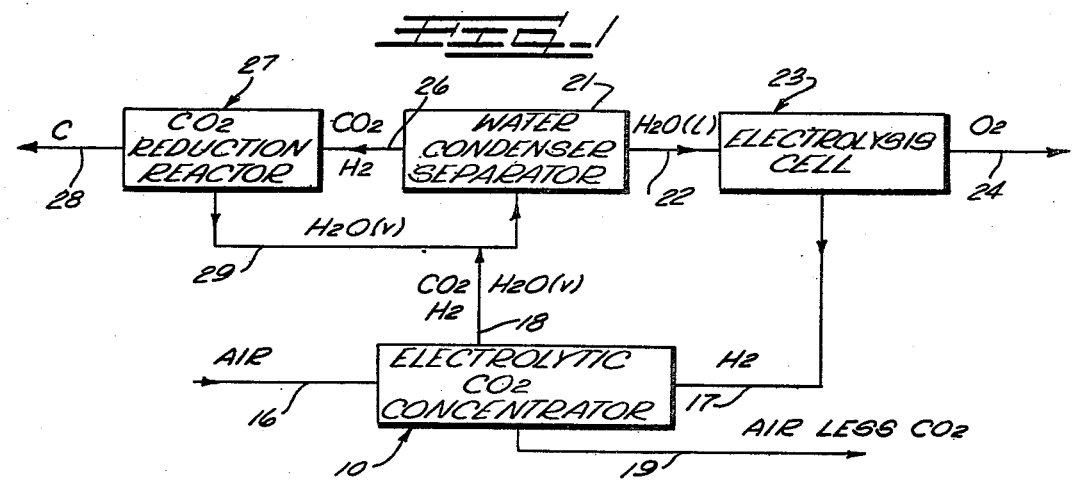
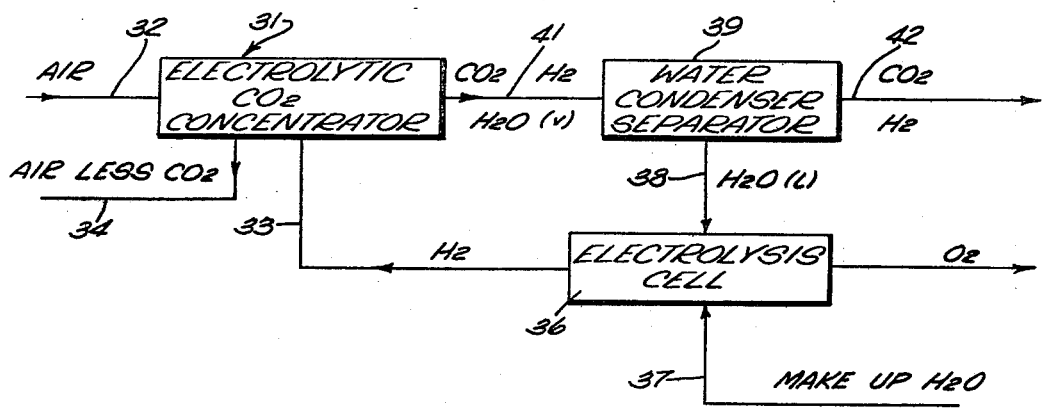
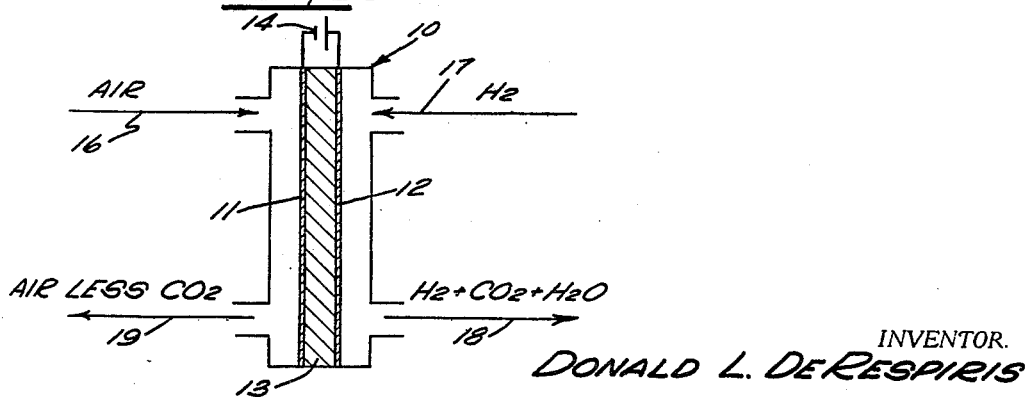
INVENTOR.
DONALD L. DeRESPIRIS
BY _____ ATTORNEYS

United States Patent Office 3,494,842
Patented Feb. 10, 1970

3,494,842
ATMOSPHERIC CONTROL UTILIZING AN ELECTROLYTIC CARBON DIOXIDE CONCENTRATOR
Donald L. De Respiris, Wickliffe, Ohio, assignor to TRW Inc., Cleveland, Ohio, a corporation of Ohio
Filed Aug. 26, 1965, Ser. No. 482,798
Int. Cl. B01k 1/00
U.S. Cl. 204—129       6 Claims

ABSTRACT OF THE DISCLOSURE

Method and apparatus for reducing the amount of carbon dioxide in air wherein a hydrogen depolarized concentration cell having a carbonate electrolyte is used to convert the carbon dioxide into carbonate ions which are then reacted with hydrogen to form carbon dioxide and water, and the carbon dioxide depleted gas is then recovered from the vicinity of the cathode of the concentration cell.

---

The present invention relates to a method and apparatus for atmosphere control, and specifically it is directed to means for reducing the amount of carbon dioxide in air for respiratory purposes. While not limited thereto, the method and apparatus of the present invention are particularly adaptable to closed cycle environments which require the recirculation of air, with replenishment of the oxygen content, and diminution of the carbon dioxide as, for example, in underground habitations, submarines and the like.

The removal of carbon dioxide from air necessitates a concentration of the carbon dioxide content to a level at which it is feasible to process it.

The present invention provides a system for the regeneration of oxygen from carbon dioxide in either a closed regenerative life support system or a non-regenerative life support system, utilizing an electrolytic concentration cell for the removal and concentration of carbon dioxide from the atmosphere.

One of the objects of the present invention is to provide an improved method for removing carbon dioxide from admixture with gases, particularly from admixture with oxygen and nitrogen in air.

Another object of the invention is to provide a method for separating carbon dioxide from air and then reducing the carbon dioxide to produce oxygen for breathing purposes.

A further object of the invention is to provide an apparatus for the efficient concentration of carbon dioxide utilizing a concentration cell which is depolarized by the introduction of hydrogen gas.

Still another object of the invention is to provide an integrated system for replenishing breathable air in a confined space, while recovering the carbon dioxide and reducing the same to produce oxygen used up during the respiratory processes.

In accordance with the present invention, I provide an electrolytic cell for concentrating carbon dioxide, the cell being depolarized by means of hydrogen. The cell employs a carbonate electrolyte, typically an aqueous solution of an alkali metal carbonate such as potassium carbonate or sodium carbonate.

The principle of the concentration cell of the present invention may be represented schematically by the following:

$$CO_2(cP_{CO_2}), O_2(cP_{O_2}), M\ CO_3 = \text{electrolyte } M,$$
$$O_2(aP_{O_2}), CO_2(aP_{CO_2})$$

where ($aP$) is the anode partial pressure of the indicated gas, ($cP$) is the cathode partial pressure of the indicated gas, and M is a metallic electrode The use of $CO_3^=$ ions in the schematic and in the equations that follow is not to be interpreted as if $CO_3^=$ ions are exclusively the transport specie. It should be understood that the transport process will depend upon the concentrations of carbonate and bicarbonate ions which are in equilibrium with carbon dioxide introduced into the cathode, e.g., for $HCO_3^-$ ions predominating in solution the following reaction scheme applies:

Cathode:
$$4CO_2 + O_2 + 2H_2O + 4e^- \rightarrow 4HCO_3^-$$
Anode:
$$4HCO_3^- \rightarrow 4CO_2 + O_2 + 2H_2O + 4e^-$$
Net Reaction:
$$4CO_2 + O_2 \rightarrow 4CO_2 + O_2$$
$$\text{Cathode} \quad \text{Anode}$$

The individual reactions for the carbonate cell are given in the following equations:

Cathode:
$$2CO_2 + O_2 + 4e^- = 2CO_3^=$$
Anode:
$$2CO_3^= = 2CO_2 + O_2 + 4e^-$$
Net:
$$2CO_2(cP_{CO_2}) + O_2(cP_{O_2}) = 2CO_2$$
$$(aP_{CO_2}) + O_2(aP_{O_2})$$

Thus, the net reaction is the spontaneous transfer of carbon dioxide and oxygen from cathode to anode of the cell, provided that the following relationship exists:

$$cP^2_{CO_2} \times cP_{O_2} > aP^2_{CO_2} \times aP_{O_2}$$

The electrical potential generated by the above reaction is proportional to the difference:

$$cP^2_{CO_2} \times cP_{O_2} - aP^2_{CO_2} \times aP_{O_2}$$

And since a maximum is reached when the quantity $(aP_{O_2})$ approaches zero, the most efficient mode of operation occurs when the anode is depolarized by a fuel, for example, hydrogen.

The reactions occurring for the depolarized mode of operation are listed below:

Cathode:
$$O_2 + 2CO_2 + 4e^- = 2CO_3^=$$
Anode:
$$2CO_3^= + 2H_2 = 2CO_2 + 2H_2O + 4e^-$$
Net:
$$CO_2(cP_{CO_2}) + O_2 + 2H_2 = CO_2(aP_{CO_2}) + 2H_2O$$

A further description of the present invention will be made in conjunction with the attached sheet of drawings in which:

FIGURE 1 is a schematic representation of a regenerative life support system embodying the improvements of the present invention;

FIGURE 2 is a schematic representation of a non-regenerative life support system employing the improvements of the present invention; and FIGURE 3 is a somewhat schematic view of the improved electrolytic carbon dioxide concentrator employed with either of the systems of FIGURES 1 or 2.

As shown in the drawings:

In FIGURE 1, reference numeral 10 indicates generally an electrolytic carbon dioxide concentrator which forms one of the principal features of the present invention. The specific details of the concentrator 10 are best shown in FIGURE 3 of the drawings. As seen in that figure, the concentrator 10 includes a cathode 11, and an anode 12 spaced therefrom by means of an electrolyte 13. In the illustrated form of the invention, the electrolyte 13 consists of a matrix of asbestos fibers which has been impregnated with a carbonate solution, such as a five normal solution of potassium carbonate. The electrodes 11 and 12 are connected to an external load such as a battery 14 or a resistance.

Air is introduced against the cathode 11 through a line 16. The carbon dioxide and oxygen from the air is then transported through the electrolyte 13 in the form of carbonate ions. These ions then react with hydrogen gas introduced into the anode compartment through a line 17. The reaction takes place at the anode gas-electrolyte interface to produce pure carbon dioxide and water which, together with the unreacted hydrogen, is withdrawn from the anode space by means of a line 18. The air which has become depleted in carbon dioxide is withdrawn from the cathode space by means of a line 19.

In the overall system shown in FIGURE 1, the carbon dioxide, hydrogen, and water vapor withdrawn from the electrolytic carbon dioxide concentrator cell 10 through the line 18 are introduced into a water condenser and separator 21 from which liquid water is withdrawn by means of a line 22. The liquid water passes to an electrolysis cell 23 where it is electrolytically dissociated into hydrogen gas (which passes out through the line 17 into the concentrator 10) and oxygen gas which is delivered to the breathing space by means of a line 24.

After the removal of the water vapor from the mixture in the separator 21 the remaining carbon dioxide and hydrogen are passed by means of a line 26 into a carbon dioxide reduction reactor 27. In this reactor 27, the carbon dioxide and hydrogen are reacted at temperatures of about 1100 to 1400° F. in the presence of an iron catalyst to produce carbon and water. The carbon may be periodically withdrawn by means of a line 28, while the water evolved may be passed by means of a line 29 into the condenser and separator 21 for further condensation and subsequent electrolysis to hydrogen and oxygen.

In the non-regenerative system shown in FIGURE 2 of the drawings, reference numeral 31 has been applied to an electrolytic carbon dioxide concentrator which may be identical to that shown in FIGURE 3 of the drawings. Air is introduced into the concentrator by means of a line 32, and hydrogen gas is introduced by means of a line 33. The air from which the carbon dioxide has been extracted is passed to the breathing space 34 for reconstitution with additional amounts of oxygen.

The hydrogen fed to the concentrator 31 through the line 33 is derived from an electrolysis cell 36. Two sources of water are provided for the cell 36, one being make-up water introduced through a line 37, and the other being condensed water introduced through a line 38 and formed in a water condenser separator stage 39. The input to this stage consists of the carbon dioxide, hydrogen gas, and water vapor emanating from the concentrator 31, and passing through a line 41 into the separator 39. The non-condensable gases, consisting of the carbon dioxide and hydrogen in this form of the invention may be vented by means of a line 42 or otherwise disposed of.

The specific concentration cell shown in FIGURE 3 of the drawings may be modified considerably from the specific form shown therein. The cell electrolyte may be an aqueous solution of an alkaline carbonate immobilized in a suitable matrix such as an asbestos diaphragm, or it may consist of a molten salt electrolyte, or even an ion-exchange membrane. While potassium carbonate is the preferred electrolyte material, it is also possible to use an aqueous solution of either a carbonate or a bicarbonate, since any aqueous solution contains an equilibrium concentration of both. Sodium bicarbonate and lithium carbonate are comparatively insoluble, so that saturated solutions of these salts will normally be used. Cesium carbonate can also be employed, but is quite expensive.

The electrodes should be chosen so as to be compatible with the electrolyte, that is, not corroded by the electrolyte. Actually, any combination of metals or metals on substrates may be employed, for example, pressed or sintered metal electrodes, or screen supported metal electrodes.

The operating conditions, of course, vary with the nature of the cell. Typical conditions when using platinum electrodes and a potassium carbonate-asbestos matrix electrolyte include voltages ranging from about 1.00 to 0.30 volt, and current densities ranging from about 0.00 to 125 a.s.f. The temperatures may vary widely, ranging from about room temperature to temperatures up to the volatilization point of the electrolyte.

In a specific embodiment of the invention, a concentration cell was made up wherein the electrodes consisted of a mixture of platinum black and polytetrafluoroethylene pressed into a wire mesh screen. The electrolyte was composed of an asbestos diaphragm saturated with an aqueous solution of potassium carbonate. The cell was operated for several hours on air containing 0.5% carbon dioxide. The power density at the end of 8 hours was 10 watts per square foot at 0.46 volt. The effluent anode gas (non-condensibles) was a mixture of 44% carbon dioxide and 56% hydrogen.

The regenerative life support system of the present invention has several distinct advantages. For one, there is a net reduction in power requirements for the system. For another, continuous processing of the carbon dioxide is possible. In addition, there is a reduction in the complexity of the system insofar as plumbing, controls and gas separation schemes are concerned. Furthermore, the system can be made lightweight and with a small volume.

It should be evident that various modifications can be made to the described embodiments without departing from the scope of the present invention.

I claim as my invention:

1. The method of separating carbon dioxide from admixture with other gases which comprises providing an anode and a cathode with a carbonate electrolyte therebetween, contacting the cathode with a gaseous mixture containing carbon dioxide whereby the carbon dioxide present is transported through said electrolyte in the form of carbonate ions, contacting the anode with hydrogen gas to thereby convert said ions into carbon dioxide and water, and collecting the carbon dioxide depleted gas from the vicinity of said cathode.

2. The method of separating carbon dioxide from a gaseous mixture which comprises providing an aqueous solution of an alkaline carbonate electrolyte between a corrosion resistant anode and cathode, contacting the cathode with said gaseous mixture whereby the carbon dioxide present is transported through said electrolyte in the form of carbonate ions, contacting the anode with hydrogen gas to thereby convert said ions into carbon dioxide and water, and collecting the carbon dioxide depleted gas from the vicinity of said cathode.

3. The method of claim 2 in which said electrolyte is potassium carbonate.

4. The method of claim 2 in which said electrolyte is sodium carbonate.

5. The method of removing carbon dioxide from air which comprises subjecting water to electrolysis in an electrolysis zone to produce oxygen and hydrogen gases, passing the air to be treated to the cathode of a concentration cell containing an anode, a cathode, and a carbonate electrolyte therebetween, passing the hydrogen gas produced by said electrolysis to the anode of said cell whereby the carbon dioxide present is transported through said electrolyte in the form of carbonate ions and said ions are converted to carbon dioxide and water by reaction with said hydrogen, recovering the carbon dioxide depleted air from said cell, condensing the water produced in said cell, and passing the condensed water to said electrolysis cell for further dissociation into hydrogen and oxygen gases.

6. The method of claim 5 in which the carbon dioxide and hydrogen recovered from said cell are reacted to form carbon and water.

References Cited

UNITED STATES PATENTS

| | | | |
|---|---|---|---|
| 3,124,520 | 3/1964 | Juda | 204—86 |
| 3,180,813 | 4/1965 | Wasp et al. | 204—129 |
| 3,374,158 | 3/1968 | Lord et al. | 204—129 |
| 3,401,099 | 9/1968 | McEvoy | 204—129 |
| 3,401,100 | 9/1968 | Macklin | 204—103 |
| 2,726,930 | 12/1955 | Edwards et al. | 23—150 |
| 3,079,237 | 2/1963 | Taylor | 23—209.5 |
| 3,242,058 | 3/1966 | Ganley et al. | 202—176 |
| 3,344,050 | 9/1967 | Mayland et al. | 204—98 |

HOWARD S. WILLIAMS, Primary Examiner

H. M. FLOURNOY, Assistant Examiner

U.S. Cl. X.R.

204—103